(12) United States Patent
Robert

(10) Patent No.: US 8,067,492 B2
(45) Date of Patent: Nov. 29, 2011

(54) BIODEGRADABLE HOT-MELT ADHESIVE COMPOSITION

(75) Inventor: Christophe Robert, Thourotte (FR)

(73) Assignee: Bostik SA, Paris la Defense Cedex (FR)

( * ) Notice: Subject to any disclaimer, the term of this patent is extended or adjusted under 35 U.S.C. 154(b) by 0 days.

(21) Appl. No.: 12/867,559

(22) PCT Filed: Feb. 13, 2009

(86) PCT No.: PCT/FR2009/000162
§ 371 (c)(1),
(2), (4) Date: Aug. 13, 2010

(87) PCT Pub. No.: WO2009/115672
PCT Pub. Date: Sep. 24, 2009

(65) Prior Publication Data
US 2010/0330315 A1    Dec. 30, 2010

(30) Foreign Application Priority Data
Feb. 14, 2008 (FR) ..................... 08 00809

(51) Int. Cl.
*C08L 93/04* (2006.01)
(52) U.S. Cl. ........ 524/270; 524/275; 524/277; 524/487; 524/488; 524/489
(58) Field of Classification Search .......... 524/270, 524/275, 277, 487, 488, 489
See application file for complete search history.

(56) References Cited

U.S. PATENT DOCUMENTS

| | | | |
|---|---|---|---|
| 5,252,646 A * | 10/1993 | Iovine et al. | 524/270 |
| 5,312,850 A * | 5/1994 | Iovine et al. | 524/47 |
| 6,713,184 B1 | 3/2004 | Ferencz et al. | |
| 2003/0049438 A1 * | 3/2003 | Hawes et al. | 428/343 |
| 2005/0136271 A1 | 6/2005 | Germroth et al. | |

FOREIGN PATENT DOCUMENTS

| | | |
|---|---|---|
| EP | 0553394 A1 | 8/1993 |
| EP | 0741178 A2 | 11/1996 |
| EP | 1008629 A1 | 6/2000 |
| EP | 1048683 A1 | 11/2000 |
| WO | PCT/FR2009/000162 R | 8/2009 |

OTHER PUBLICATIONS

Institut National De La Propriete Industrielle. "Search Report and Written Opinion." FR0800809. Applicant: Bostik SA. Mailed Oct. 22, 2008.

* cited by examiner

*Primary Examiner* — Peter Szekely
(74) *Attorney, Agent, or Firm* — Millen, White, Zelano & Branigan, P.C.

(57) ABSTRACT

The invention relates to biodegradable hot-melt adhesive compositions, preferably without residual tackiness at room temperature and having a biodegradability, as measured by the released carbon-dioxide analysis method pursuant to Standard EN ISO 14855, that is higher than 55%, preferably higher than 60%, and preferably higher than 90%, and to the use thereof. This percentage is given by reference with the cellulose biodegradability measurement, which amounts to 100% in the same conditions.

20 Claims, 2 Drawing Sheets

Transfer of the printed face to the hot melt

Coated paper

BIODEGRADABLE HOT-MELT ADHESIVE COMPOSITION

FIELD OF THE INVENTION

The present invention relates to biodegradable hot-melt adhesive compositions and the use thereof in very many fields of application and in particular in the field of packaging.

TECHNOLOGICAL BACKGROUND TO THE INVENTION

In the context of the developing market in so-called "bio" products, the big players among the major supermarket chains are turning to their suppliers, demanding products that fulfil these expectations.

These expectations are further increased as European directives require the progressive introduction of so-called "compostable" products that in particular satisfy the criteria set out in the European standard EN13432. In this connection, standard EN13432 specifies that the biodegradability of a product measured according to the released carbon-dioxide analysis method set out in EN ISO 14855 must be greater than 90%.

In the fields of packaging in general such as for example the closure of cans and cases, the assembly of cardboard trays, or in the more specific field of food packaging, adhesive compositions are commonly used for bonding printed papers onto any type of container, for food use or not, such as paper, bottles or pots, these containers sometimes being made from polystyrene, polypropylene, polylactic acid.

Customers' expectations in terms of compostable products are reflected at the level of the suppliers of each part of the packaging and customers require each of the components of a product to be biodegradable.

As a result, the supply of packaging items that are fully compostable or biodegradable therefore also involves the supply of hot-melt adhesive compositions that are compostable and/or biodegradable.

In this context, a hot-melt adhesive must also comply with said biodegradability standard EN ISO 14855 while retaining all of the other properties of a standard hot-melt adhesive, in particular the properties necessary for applying labelling to any type of container, for food use or not.

U.S. Pat. No. 5,312,850 describes the preparation of hot-melt adhesive compositions using certain ingredients known to be biodegradable. These compositions include 20 to 98% by weight polylactide (PLA) polymer containing at least 20% moles of lactide monomer, 2 to 80% adhesion-promoting resin having a softening point according to ASTM E 26 of approximately 60° C., 0 to 50% plasticizing agent and 0 to 30% wax as diluent and 0 to 3% stabilizing agent. No indication is given with respect to the biodegradability of the final composition according to standard EN ISO 14855.

WO 95/10577 describes the production of hot-melt adhesive compositions, preferably pressure-sensitive (hot melt pressure sensitive adhesives or HMPSA) called fully biodegradable/compostable by combining polyesters derived from lactic acid which are already known biodegradable polymers with biodegradable plasticizing resins based on polylactic acid (PLA), having a molecular weight less than 20,000 and having a Tg less than 60° C. No indication is given with respect to the biodegradability of the final composition according to standard EN ISO 14855.

These compositions containing PLA are not suitable for the fields of food packaging as they have the drawbacks of being rather stiff and having a heat-reactivation temperature that is too high for applications in the sought fields.

In the field of biodegradable hot-melt adhesive compositions without PLA, EP553394 describes the preparation of hot-melt adhesive compositions comprising a specific polyester obtained from 3-hydroxy-butyric and 3-hydroxy-valeric acid. No indication is given with respect to the biodegradability of the final composition according to standard EN ISO 14855.

EP 741178 also describes the preparation of hot-melt adhesive biodegradable compositions comprising a specific polyester obtained by reaction between a carboxylic diacid and a diglycidyl ether or ester. No indication is given with respect to the biodegradability of the final composition according to standard EN ISO 14855.

There is therefore a need to have available compostable hot-melt adhesive compositions capable of complying with European standard EN ISO 14855 and also fulfilling all the properties of a standard hot-melt adhesive, in particular the properties for applying labelling to any type of container, for food use or not.

SUMMARY OF THE INVENTION

The purpose of the present invention is therefore to provide hot-melt adhesive compositions, preferably without residual tackiness at ambient temperature (in other words, without tackiness or also without instant bonding ability at ambient temperature) and the biodegradability of which, measured according to the released carbon-dioxide analysis method according to standard EN ISO 14855, is greater than 55%, preferably greater than 60%, preferably greater than 90%. This percentage is given by way of reference to the cellulose biodegradability measurement which represents 100% under the same conditions.

To this end the invention proposes:

A biodegradable hot-melt adhesive composition comprising (A) from 30% to 90%, preferably 40% to 60%; or also 45% to 55% by weight with respect to the total weight of the adhesive composition, a (co)polymer chosen from (A1) polycaprolactones, (A2) polyesters resulting from the condensation of a carboxylic diacid of formula $R_1-[COOH]_2$ in which $R_1$ represents a linear or weakly branched or cyclic $C_2$-$C_{30}$ hydrocarbon group, saturated or unsaturated, mono or polyhydroxylated, with a diol of formula $R_2[OH]_2$ in which $R_2$ represents a linear, weakly branched, cyclic or polycyclic $C_2$-$C_{32}$ hydrocarbon group, saturated, unsaturated or polyunsaturated, mono or polyhydroxylated or (A3) polycaprolactone copolymers (A1) and polyester copolymers (A2);

(B) from 10% to 50%, preferably 20% to 40%, or also 25% to 35% by weight with respect to the total weight of the adhesive composition, an adhesion-promoting agent (or tackifier) having an average molecular mass by weight $M_w$ comprised between 300 and 5000 and chosen from:
  (i) rosins of natural origin or modified;
  (ii) terpene resins resulting from the polymerisation of terpene hydrocarbons in the presence of Friedel-Crafts catalysts, optionally modified by the action of phenols;
  (iii) copolymers based on natural terpenes;

(C) from 10% to 30%, preferably 10% to 25% by weight with respect to the total weight of the adhesive composition, a stiffening agent represented by a wax having a melting point comprised within the range 40° C. to 150° C., preferably chosen from optionally hydroxylated amide waxes, hydrogenated castor oils, synthetic waxes, oxidized or not, functionalized or not, polyethylene oxides the average molecular mass by weight of which is greater than 1000;

(D) 0% to 20%, preferably 3% to 7% by weight with respect to the total weight of the adhesive composition, one or more additives chosen from stabilizers, antioxidants, anti-blocking agents, pigments, colorants or fillers. Preferably, in the composition according to the invention the (co)polymer (A) has a number-average molecular mass (Mn) from 500 to 100,000 g/mole, preferably 2000 to 60,000 g/mol.

Preferably, in the composition according to the invention, the carboxylic diacid of formula $R_1$—$[COOH]_2$ is chosen from sebacic, succinic, adipic, aldaric, alpha-ketoglutaric, aspartic, azelaic, camphoric, fumaric, glutaconic, glutaric, itaconic, maleic, malic, malonic, meglutol, mesaconic, mesoxalic, 3-methylglutaconic acids.

Preferably, in the composition according to the invention, the diol of formula $R_2[OH]_2$ is chosen from the diols of linear, weakly branched structure, saturated or unsaturated, of formula $R_2[OH]_2$ in which $R_2$ represents a $C_2$-$C_{22}$ hydrocarbon group, the diols of formula HO—(—$CH_2$—$CH_2$—O—)$_n$—H such that n is an integer from 1 to 6.

Preferably, in the composition according to the invention (B) is chosen from the glycerol or pentaerythritol esters of rosins, terpenes, or also phenolic terpenes, in particular the phenolic terpenes having a softening point comprised between 100° C. and 150° C.

Preferably, in the composition according to the invention (C) is chosen from the amide waxes of the oleamide, stearamide, ethylene bis-oleamide, ethylene bis-stearamide type, preferably those having a melting point comprised between 60° C. and 120° C.

Preferably; in the composition according to the invention, (A) represents a polyester obtained by reaction between monoethylene glycol and sebacic acid
(B) represents a phenolic terpene resin;
(C) represents an amide wax chosen from oleamide or erucamide cis-13-docosenamide;
(D) represents an anti-blocking additive chosen from polyethylene glycol, precipitated silica or a mixture thereof.

Moreover, the hot-melt adhesives according to the invention also have the following properties:

According to the chosen types of formulations, they have a viscosity comprised within a wide range from 500 to 200,000 mPa·s, which makes them suitable for applications on a flexible support or a non-flexible support;

According to the chosen types of formulations, they have a reactivation temperature from approximately 40° C. to 150° C. which make them suitable for any type of flexible or non-flexible application; for more specific applications on a flexible support, formulations will be chosen the reactivation temperature of which is within the range 60-110° C.

Depending on the chosen types of formulations, they have an open assembly time that can be adapted to different types of applications; thus for delayed bonding applications on a flexible support a hot-melt adhesive will be chosen having an open assembly time of almost zero or less than 1 second or preferably less than 0.5 sec; for applications on a stiff support a hot-melt adhesive will be chosen having an open assembly time greater than or equal to 2 seconds, preferably from 3 to 30 seconds or also from 5 to 15 seconds.

According to an embodiment, the composition according to the invention has an open assembly time measured on an OLINGER device of less than 1 second, (preferably less than 0.5 second).

According to an embodiment, the composition according to the invention has an open assembly time measured on an OLINGER device greater than or equal to 2 seconds, (preferably from 5 to 30 seconds).

According to another subject, the invention relates to the use of a composition according to the invention capable of being reactivated in order to create a seal between two non-flexible supports, for example two cardboards.

Preferably the use is carried out with a composition the viscosity of which is comprised between 500 and 20,000 mPa·s for applications by melting pan and roller coating.

Preferably the use is carried out with a composition the viscosity of which is comprised between 2,000 and 50,000 mPa·s for applications by melting pan or drum-drainer and spray coating.

Preferably the use is carried out with a composition the viscosity of which is comprised between 70,000 and 200,000 mPa·s for applications by extrusion coater and spray coating.

Preferably the invention relates to the use of a composition according to the invention for the preparation of non-flexible to rigid biodegradable packaging intended for food use or non-food use.

Preferably the invention relates to the use of a composition according to the invention for textile applications such as motor vehicle or aeronautical seat trims, cosmetic, tobacco, pharmaceutical, medical packing.

Preferably the invention relates to the use of a composition according to the invention for preparing rigid packaging, for box and case closures, forming cardboard trays, labelling bottles, binding, coating paper, cardboard.

DETAILED DESCRIPTION OF EMBODIMENTS OF THE INVENTION

Figure 1:
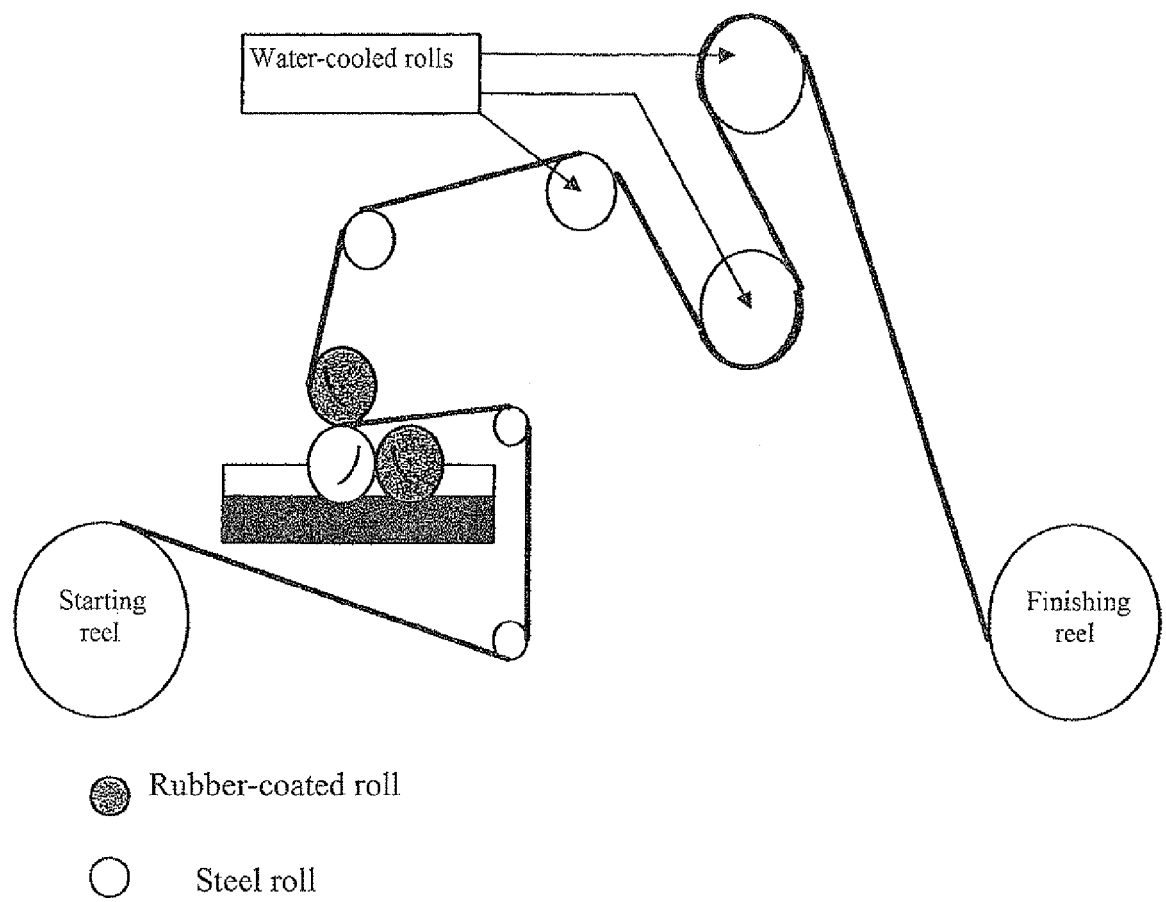
FIGS. 1-3 represent diagrams of coating apparatuses used in a process employing the invention.

Description of the Compositions According to the Invention
(A) Polymer Portion.

This portion comprises a (co)polymer preferably having a molecular weight of 500 to 100,000 g/mol, chosen from (A1) polycaprolactones, (A2) polyesters resulting from the condensation of a carboxylic diacid of formula $R_1$—$[COOH]_2$ in which $R_1$ represents a linear or weakly branched or cyclic $C_2$-$C_{30}$ hydrocarbon group, saturated or unsaturated, mono or polyhydroxylated with a diol of formula $R_2[OH]_2$ in which $R_2$ represents a linear, weakly branched, cyclic or polycyclic $C_2$-$C_{32}$ hydrocarbon group, saturated, unsaturated or polyunsaturated, mono or polyhydroxylated or (A3) copolymers obtained from polycaprolactones (A1) and polyesters (A2) or a mixture thereof;

(A) represents from 30% to 90%, preferably 40% to 60%, preferably also 45% to 55% by weight with respect to the total weight of the adhesive composition.

(A1) The polycaprolactones are formed by ring-opening reaction of an epsilon-caprolactone monomer with a mono-, di-, or multi-functional initiator in which the functional groups, generally hydroxy groups, are capable of carrying out a ring-opening reaction with the epsilon-caprolactone monomers. In such reactions, the initiator will be a minor component and the ratio by weight of initiator to monomer will determine the molecular weight of the resulting polymer. The polycaprolactone polymers preferably have a molecular weight of 5000 to 100,000 g/mol.

(A2) The polyesters of the invention are formed by reaction between a carboxylic diacid of formula $R_1$—$[COOH]_2$ in which $R_1$ represents a linear or weakly branched or cyclic $C_2$-$C_{30}$ hydrocarbon group, saturated or unsaturated, mono or polyhydroxylated and a diol of formula $R_2[OH]_2$ in which $R_2$ represents a linear, weakly branched, cyclic or polycyclic $C_2$-$C_{32}$ hydrocarbon group, saturated, unsaturated or polyunsaturated, mono or polyhydroxylated, Preferably, the diacid is chosen alone or in a mixture from:
1) a linear diacid, saturated or unsaturated, of natural or synthetic origin of formula $R_1$—$[COOH]_2$ in which $R_1$ represents a $C_2$-$C_{30}$ hydrocarbon group such as for example succinic acid, glutaric acid, pimelic acid, azelaic acid, sebacic acid, traumatic acid, ($C_{16}$-$C_{26}$ α,ω-diacid) suberin;
2) a fatty diacid obtained by dimerization of a fatty acid of animal or plant origin;
3) a mono- or poly-hydroxylated diacid such as for example tartaric acid, tartronic acid, aldaric acids;
4) an amino acid for example aspartic acid,
5) a mono or polyhydroxylated diacid, saturated or unsaturated and/or weakly branched or not, for example meglutol, 3-methylglutaconic acid, mesaconic acid, crocetin, alkylitaconic acids (chaetomellic and ceriporic acids).

The carboxylic diacids are preferably chosen from adipic, aldaric, alpha-ketoglutaric, aspartic, azelaic, camphoric, tartaric, glutaconic, glutaric, itaconic, maleic, malic, malonic, meglutol, mesaconic, mesoxalic, 3-methylglutaconic acids, alone or a mixture thereof.

Preferably, the diols are chosen alone or in a mixture from:
1) a diol of linear, weakly branched structure, saturated or unsaturated, having a structure of formula $R_2[OH]_2$ in which $R_2$ represents a $C_2$-$C_{32}$ hydrocarbon group.
2) a dimer diol derived from unsaturated fatty alcohols,
3) a diol of formula $R_2[OH]_2$ in which $R_2$ represents a mono- or poly-hydroxylated saturated or unsaturated $C_2$-$C_{12}$ hydrocarbon group.
4) a cyclic or polycyclic diol such as for example 1,2-cyclohexanedimethanol, the diols derived from sugars such as 1,4:3,6-dianhydro-d-glucitol (DAG), 1,4: 3,6-dianhydro-d-mannitol (DAM), 1,4:3,6-dianhydro-1-iditol (DAI).
5) the diols of formula $R_2[OH]_2$ in which $R_2$ represents a monoethylene glycol or polyethylene glycol of formula HO—$(-CH_2-CH_2-O-)_n$—H such that n is comprised between 1 and 6.

The diols are preferably chosen from the diols of linear structure, saturated or unsaturated, having the structure of formula $R_2[OH]_2$ in which $R_2$ represents a $C_2$-$C_{22}$ hydrocarbon group, the diols of formula HO—$(-CH_2-CH_2-O-)_n$—H where n is an integer from 1 to 6.

The polyesters of the invention preferably have a number-average molecular mass (Mn) comprised between 500 and 100,000 g/mol. The polyesters of the invention preferably have an MFI at 160° C. below 2.16 kg comprised between 0.2 and 1000. Preferentially, the polyester will have a number-average molecular mass (Mn) comprised between 2,000 and 60,000 Ono' and an MFI comprised between 1 and 500 g/mol.

Preferably, the polyesters of the invention are obtained by reaction of monoethylene glycol with sebacic acid.

Preferentially, when the chosen diacid is an aromatic diacid, the aromatic diacid content (of the terephthalic or isophthalic type) in the polyester will be less than 53% in moles, preferably less than 25%, in particular less than 25% isophthalic aromatics.

(A3) the copolymers obtained from the polycaprolactones (A1) and polyesters (A2).

(B) Adhesion-promoting (or tackifying) agent portion.

The tackifying resin(s) have average molecular masses by weight $M_w$ generally comprised between 300 and 5000 and are chosen in particular from:
(i) rosins of natural origin or modified, such as for example the rosin extracted from pine gum, wood rosin extracted from tree roots and their derivatives, hydrogenated, partially hydrogenated, dimerized, polymerized or esterified by monoalcohols or polyols such as glycerol;
(ii) terpene resins resulting generally from the polymerization of terpene hydrocarbons such as for example mono-terpene (or pinene) in the presence of Friedel-Crafts catalysts, optionally modified by the action of phenols;
(iii) copolymers based on natural terpenes, for example styrene/terpene, alpha-methyl styrene/terpene and vinyl toluene/terpene.

(B) represents from 10% to 50%, preferably from 20% to 40%, preferably also 25% to 35% by weight with respect to the total weight of the adhesive composition.

(B) is chosen preferably from glycerol or pentaerythritol rosin esters, terpene, or also phenolic terpenes, in particle phenolic terpenes having a softening point comprised between 100° C. and 150° C.

These resins are commercially available, and among those having a softening temperature comprised between 80 and 150° C. in the above categories the following products can be mentioned for example:
(i) Sylvalite® RE 100S from Arizona Chemical, Dertoline® G2L and Dertopoline® CG from the French company DRT;
(ii) Dertophene T, Dertophene® H 150 from DRT; Sylvarez® TP95, Sylvarez®TP115 from Arizona Chemical; Sylvares® 2040 from Arizona Chemical;
(iii) Sylvarez® ZT 105 LT from Arizona Chemical.

The softening temperature (or point) of these resins is determined according to standard test ASTM E 28, the principle of which is as follows. A brass ring having a diameter of approximately 2 cm is filled with the resin to be tested in the molten state. After cooling to ambient temperature, the ring and the solid resin are placed horizontally in a temperature-controlled glycerin bath, the temperature of which can vary by 5° C. per minute. A steel ball having a diameter of approximately 9.5 mm is centred on the disk of solid resin. The softening temperature—during the phase of temperature increase of the bath at the rate of 5° C. per minute—is the temperature at which the resin disk is forced downward a distance of 25.4 mm under the weight of the ball.

(C) Stiffening agent portion.

These agents are waxes characterized by a melting point measured by differential scanning calorimetry (DSC), comprised between 40° C. and 150° C., preferentially between 50° C. and 100° C. in the case of coating on a flexible support with delayed adhesion and between 100° C. and 140° C. in the case of an instant adhesion application on a flexible or non-flexible.

These waxes are chosen from optionally hydroxylated amide waxes, hydrogenated castor oils, synthetic waxes, oxidized or not, functionalized or not, polyethylene oxides, the average molecular mass by weight of which is greater than 1000.

Preferably, waxes chosen from ethylene bis stearamide, ethylene bis oleamide, stearamide, paraffins, Fischer-Tropsch waxes, oleamides, erucamide, cis-13-docosenamide, ethylene glycol monostearate, cethyl palmitate, saturated linear alcohols, carboxylic acids are used.

Also preferably used are the waxes chosen from the amide waxes of the oleamide, stearamide, ethylene bis-oleamide, ethylene bis-stearamide type, preferably also the amide waxes of the oleamide, stearamide, ethylene bis-oleamide type having a melting point comprised between 60° C. and 120° C.

(C) represents from 10% to 30% preferably 10% to 25% by weight with respect to the total weight of the adhesive composition.

(C) represents preferably an amide wax chosen from oleamide or erucamide cis-13-docosenamide.

(D) Additive Portion

In the composition according to the invention, in order to improve certain properties, it is possible optionally to use a quantity of 0% to 20% preferably 3% to 7% by weight of one or more additives with respect to the total weight of the adhesive composition.

These additives are chosen from stabilizers, antioxidants, anti-blocking agents, pigments, colorants or fillers.

(D1) The stabilizing (or antioxidant) agents are introduced in order to protect the composition from degradation resulting from a reaction with oxygen which is likely to be caused by the action of heat, light or residual catalysts on certain raw materials such as the tackifying resins.

The compounds used are chosen from pentaerythritol tetrakis 3-(3,5-di-tert-butyl-4-hydroxyphenyl) propionate, 2-(1-(2-hydroxy-3,5-ditertiopenthylphenyl) ethyl)-4,6-ditertiopentylphenyl acrylate, pentaerythrityl tetrakis(3-laurylthiopropionate), aromatic polycarbodiimide, substituted diarylcarbodiimide, aromatic polycarbodiimide.

Preferably, primary antioxidants are used which trap the free radicals and which are generally substituted phenols such as Irganox® 1010 from CIBA pentaerythritol tetrakis 3-(3,5-di-tert-butyl-4-hydroxyphenyl) propionate. The primary antioxidants can be used alone or in combination with other anti-oxidants such as phosphites like Irgafos® Irgafos® 168 also from CIBA, or also with UV stabilizers such as amines.

(D2) The anti-blocking agents are introduced in particular in order to prevent adhesion of the face coated with hot-melt adhesive onto the printed surface during the production and storage of the reels. For example for yoghurt wrapping applications.

These compounds are chosen from ethylene bis-stearamide, ethylene bis-oleamide, stearamide, oleamide, erucamide, cis-13-docosenamide, ethylene glycol monostearate, cetyl palmitate, saturated linear alcohol, carboxylic acid. Polyethylene glycol or precipitated silica can also preferably be used.

(D3) The pigments and colorants are introduced in order to modify the colour of the adhesive mass without modifying the other properties thereof.

(D4) The fillers are introduced in order to reinforce the cohesion of the adhesive, reduce the cost, or modify the adhesive performance by altering the quantity and the nature of the filler introduced. These compounds are chosen from talc, carbonates, silica, kaolin, sulphates, clays.

Method for the Preparation of the Compositions.

The hot-melt composition according to the invention is prepared by simple mixing of its components at a temperature comprised between 100 and 200° C., until a homogeneous mixture is obtained. The required mixing techniques are well known to a person skilled in the art.

Properties of the Compositions According to the Invention.

The compositions have all the properties necessary to be biodegradable hot-melt adhesive compositions.

Biodegradability.

They have a biodegradability measured according to the released carbon-dioxide analysis method (standard EN ISO 14855) greater than 55%, preferably greater than 60%, preferably also greater than 90%. Said percentage is given by way of reference to the biodegradability of the cellulose which represents 100% under the same conditions. These biodegradability results show that the hot-melt adhesives, the biodegradability of which, according to standard EN ISO 14855 is greater than 90%, are excellent candidates for fulfilling the criteria of European standard EN13432 relating to so-called "compostable" products. The compositions according to the invention reach this level of biodegradability after 6 months, and preferably after 45 days.

The adhesive compositions are preferably non-pressure sensitive, without residual tackiness at ambient temperature.

In so far as the compositions of the invention have no residual tackiness at ambient temperature, no plasticizing agent is introduced, as they are generally liquid at ambient temperature and their melting point is low, less than 25° C.

The formulations retained also have the following properties:

Viscosity

The final viscosity of the hot-melt adhesive according to the invention depends on the nature of the components used, their respective quantity and their molar mass.

Depending on the chosen types of formulations, the hot-melt adhesives have a viscosity comprised within a wide range from 500 to 200,000 mPa·s at the application temperature, which makes them adaptable to applications according to different types of method or implementation tools, on a flexible support or on a non-flexible support.

Thus when the viscosity is comprised between 500 and 20,000 mPa·s at the application temperature, applications can be targeted by melting pan and roller coating.

When the viscosity is comprised between 2,000 and 50,000 mPa·s at the temperature of application the applications can be targeted by melting pan or drum-drainer and spray coating.

When the viscosity is comprised between 70,000 and 200,000 mPa·s at the temperature of application, applications can be targeted by extrusion coater or spray coating.

Reactivation Temperature.

Depending on the chosen types of formulation, the hot-melt adhesives have a reactivation temperature ranging from approximately 40° C. to 150° C. making them suitable for any type of application, flexible or non-flexible. Thus, for more specific applications on a flexible support, formulations will be chosen, the reactivation temperature of which is within the range 60-110° C.

The choice of the polymer A has an impact on the reactivation temperature of the final composition. In fact, unlike the formulations comprising the polymers (A) according to the invention, certain polymers of the prior art do not allow the hot-melt adhesive to be obtained with the target reactivation temperatures. In fact reactivation temperatures above 150° C. have been noted in formulations J and K of the comparative examples when component A is PLA (polylactic acid) or an aromatic copolymer.

According to a particular embodiment, a reactivation temperature comprised between 60° C. and 90° C. will in particular allow the hot-melt adhesive to be sealed onto yoghurt pots during the formation of the latter.

The yoghurt pot wrapping is a printed paper coated with hot-melt adhesive on reel widths of the order of 1300 mm by means of the coating method described above.

This wrapping is then cut out, placed around yoghurt pots and reactivated, i.e. heated to a temperature above its reactivation temperature in order to melt the hot melt adhesive slightly and cause adhesion between the paper wrapping and the pot made of thermoplastic polymer such as polystyrene, polypropylene or polylactic acid.

Open Assembly Time.

Depending on the chosen types of formulations, the hot-melt adhesives have an open assembly time that can be adapted to different types of application, on a flexible or non-flexible support. The open assembly time depends mainly on the recrystallization temperatures of the different components, their glass transition temperature and also their quantities.

Thus advantageously, the compositions according to the invention have an open assembly time of less than 1 second or preferably less than 0.5 second for example for delayed adhesion applications on a flexible support.

This feature allows the hot-melt adhesive to solidify instantly once placed on the paper reels. Thus the adhesive-coated reel can be rewound on itself without delay after adhesive coating.

For applications on rigid supports such as cardboards, a hot-melt adhesive will be chosen that has an open assembly time greater than or equal to 2 seconds, preferably 3 to 30 seconds.

Moreover, the formulations also have the following properties necessary for the hot-melt adhesives.

Thermal Stability

A thermal stability sufficient for changes in the properties of the adhesive following its degradation to be imperceptible during a standard use of the product on suitable equipment.

Residual Tackiness (Also Called Instant Bonding Ability).

These formulae do not have residual tackiness (do not bond at ambient T°).

Blocking:

These formulae are resistant to the placing of the layer of hot-melt adhesive under pressure and temperature between 2 supports without the hot-melt adhesive, or the printing on the support being transferred from one side to the other.

Slip.

These formulae also have a slip behaviour making it possible for coatings of these formulae on paper to be used on industrial production lines without damaging or fouling the drive systems and without slipping during the storage of the reels.

Compatibility. The choice of each of the components of the formula moreover has an impact on their overall compatibility in the final composition. In fact, not all the mixtures make it possible systematically to obtain homogenous compositions. In fact a compatibility defect has been noted in formulations I and L of the comparative examples when the component C is a paraffin.

Use of the Compositions According to the Invention.

The compositions according to the invention are suitable for any type of food or non-food packaging applications.

Among the types of packaging, flexible or non-flexible packaging can be mentioned.

Among the non-flexible to rigid packagings, there can be mentioned box and case closures, cardboard tray formations, labelling of bottles, binding, paper, cardboard coating capable of being reactivated in order to create a seal.

EXAMPLES

The following examples are intended to illustrate the invention without limiting its scope.

The set of results relating to the properties of the hot-melt adhesives are given in Tables 1 and 2.

Example 1

Preparation of the Compositions According to the Invention

The hot-melt composition according to the invention is prepared by simple mixing of its components at a temperature comprised between 100 and 200° C., until a homogeneous mixture is obtained. The required mixing techniques are well known to a person skilled in the art.

Formulations 1 to 6 of the compositions according to the invention are described in Table 1. Formulations I to M of the comparison compositions are described in Table 1.

Example 2

Use of the Compositions in the Methods for Coating Paper Wrappings

The Coating Method is Carried Out According to the Following Diagram:
Line diagram: FIG. 1.
Typical temperatures of the hot-melt adhesive:
Pre-melter: 165° C.
Pipes: 165° C.
Pan: 165° C.
Paper grammage: 97 g/m$^2$
Cooling water: 8° C.
Hot-melt adhesive grammage: 10 g/m$^2$ Said method is in particular used in the preparation of a yoghurt pot, in standard fashion constituted by a polystyrene container, a foil lid and a wrapping coated with hot-melt adhesive.

The printed strip for a yoghurt pot is a printed paper coated with hot-melt adhesive on the reel widths of the order of 1300 mm by means of the coating method described above.

This printed strip is then cut out, positioned around the yoghurt pots and reactivated, i.e. heated in order to re-melt the hot-melt adhesive slightly and cause adhesion between the printed paper strip and the polystyrene pot. The temperature to which the printed strip is heated is above the reactivation temperature of the corresponding hot-melt adhesive.

Example 3

Properties of the Compositions Obtained

Figure 2:
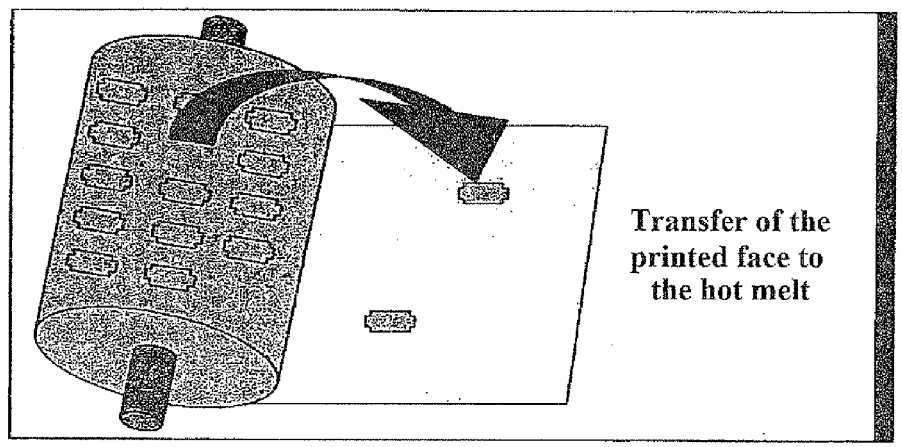
Figure 3:
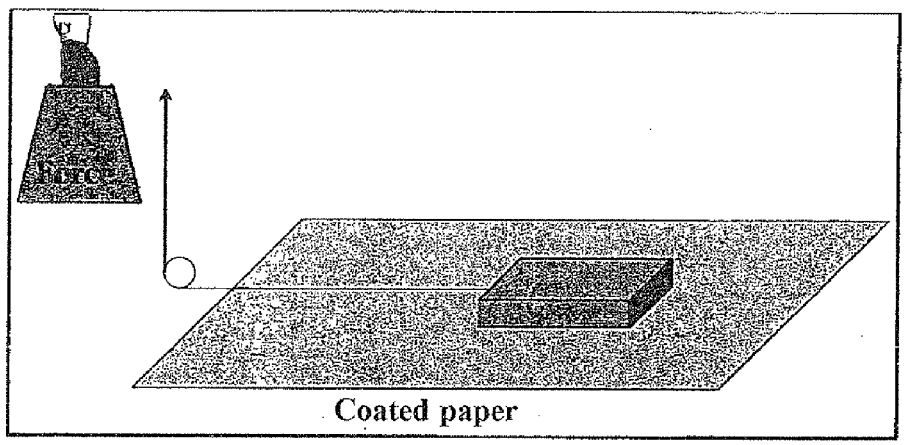

The formulations obtained are then assessed in tests characterizing the hot-melt adhesives described below:
1/Viscosity Measurement:
The viscosity is measured on each composition at 170° C. using a Brookfield viscometer.
2/Blocking
FIG. 2.
The support face (pieces of coated paper 4 cm×8 cm) coated with hot-melt adhesive is placed in contact with the printed and varnished face and then placed under a pressure of 0.7 bars at a temperature of 40° C. for 7 days.

On completion of this placing under pressure, the 2 supports are separated and a visual check is made of whether the hot-melt adhesive has been transferred from the coated face to the varnished face and/or whether the varnish and/or the ink have been transferred from the varnished face to the coated face.

The absence of any transfer is recorded by NO in Table 1.

3/Slip

A support sheet coated with hot-melt adhesive is positioned horizontally on a flat surface. A steel skid surrounded by a second coated support sheet, coated face outwards and having a mass of 200 g is positioned on the coated support, in contact with the coated face of said support.

The force necessary to displace the skid at a given speed is measured as follows:

On a dynamometer the skid surrounded by the coated support is positioned on the coated face of the printed strip. The skid is then displaced horizontally at 150 mm/min and the average force during displacement was measured, which after division by the weight of the skid is expressed in the form of the dynamic coefficient of friction (or dynamic COF).

4/Reactivation Temperature

The paper support strip coated with hot-melt adhesive is positioned on a strip of PLA at a reference temperature comprised between 50 and 150° C. so that the coated face is in contact with the PLA.

A pressure of 3 bars is applied to the assembly during a period of 1 s. After returning the assembly to ambient temperature, i.e. after approximately 5 minutes, the 2 strips are separated and the % defibration, i.e. cohesive failure inside the paper support is visually assessed.

This manual assessment is carried out after returning to ambient temperature for each reference temperature that is varied from 50 to 150° C. in steps of 5° C.

The "sealing temperature" or reactivation temperature used is the lowest reference temperature for which 100% defibration of the paper support is obtained.

5) Method of Measurement of the Open Assembly Time:

The open assembly times are measured according to the following measurement method:

A bead of hot-melt adhesive is applied to a support, then a second support is applied after X seconds. The open assembly time is the maximum value of X for the hot-melt adhesive to adhere to the second support. The measurements are taken at ambient temperature.

The measurement of open assembly time is carried out on OLINGER type equipment which makes it possible to precisely manage the time between depositing the hot-melt adhesive and placing the support in contact.

The hot-melt adhesive is molten at its application temperature then applied to a reference cardboard support in a bead from 1 to 2 mm in diameter.

A period of X seconds is timed then a second reference cardboard is positioned on the bead of hot-melt adhesive, thus creating the bond between the 2 cardboards.

The 2 cardboards are then separated manually.

The open assembly time is the maximum value of X for which a defibration of the second cardboard is observed at the time of separation.

6/Method for Measuring Biodegradability by Released Carbon-Dioxide Analysis Method According to standard EN ISO 14855, the final biodegradability and disintegration of the plastic materials are assessed under controlled composting conditions.

The test method allows the final biodegradability and disintegration of a test material to be determined under conditions simulating an intensive aerobic composting process. The inoculum is a stabilized and mature compost, obtained if possible from the composting of the organic fraction of solid municipal waste.

The test material is mixed with the inoculum and introduced into a static composting container where it is transformed into compost under optimum conditions from the point of view of the oxygen present, the humidity and the temperature, over a period not exceeding 6 months.

During the aerobic biodegradation of the test material, products of the final biodegradation are carbon dioxide, water, mineral salts and new microbial cellular constituents (biomass). The carbon dioxide produced is monitored continuously or measured at regular intervals in the test and blank containers, then integrated in order to determine the cumulative production of $CO_2$. The percentage biodegradation is obtained by comparing the $CO_2$ produced by the test material to the maximum quantity of $CO_2$ which could be obtained starting from the test material and which is calculated from the measured total organic carbon (TOC). This biodegradation percentage will not include the quantity of carbon converted to new cellular biomass which has not been metabolized into $CO_2$ during the test.

The incubation must take place in the dark or under a diffuse light, in an enclosure that must be maintained at a constant temperature of 58° C.±2° C. and free of vapours likely to inhibit the micro-organisms.

Any individual fragment of compact test material used must have a maximum surface area of 2 cm×2 cm. If the test material has a greater original size, the size of the fragments is reduced.

The ratio of the dry mass of the inoculum to that of the test material must be approximately 6 to 1.

The humidity must be maintained at approximately 50%.

The tested formulations according to this method have a biodegradability greater than 55%, preferably greater than 60%, preferably also greater than 90%. This percentage is given by way of reference to the biodegradability of the cellulose which represents 100% under the same conditions. In particular compositions 3 and 6 have % biodegradabilities of 64%.

The set of results relating to the properties of the hot-melt adhesives is shown in Tables 1 and 2.

TABLE 1

| Formulations | I | J | K | L | M | 1 | 2 | 3 | 4 | 5 | 6 |
|---|---|---|---|---|---|---|---|---|---|---|---|
| Chemical Name | | | | | | | | | | | |
| Polycaprolactone polyester copolymer (i) | | | | | | | | | | 49.5 | 49.5 |
| Polyester produced by reaction between a monoethylene glycol | | | | | | | 49.5 | 49.5 | 49.5 | | |

TABLE 1-continued

| Formulations | I | J | K | L | M | 1 | 2 | 3 | 4 | 5 | 6 |
|---|---|---|---|---|---|---|---|---|---|---|---|
| and sebacic acid (j) | | | | | | | | | | | |
| Polycaprolactone homopolymer (k) | | | | | | 49.5 | | | | | |
| Aliphatic-aromatic copolymer based on the monomers 1,4-butanediol, adipic acid and terephthalic acid (l) | | | | 49.5 | 49.5 | | | | | | |
| Polylactic acid (m) | 49.5 | 49.5 | 49.5 | | | | | | | | |
| Glycerol rosin ester (n) | | 30 | | | | | | | | | |
| Phenolic terpene resin (o) | 30 | | 30 | 30 | 30 | 30 | 30 | 30 | 30 | 30 | 30 |
| Oleamide (p) | | 20 | 20 | | 20 | 20 | 20 | 18 | 15 | 18 | 15 |
| Paraffin (q) | 20 | | | 20 | | | | | | | |
| Polyethylene glycol (r) | | | | | | | | 2 | | 2 | |
| Precipitated silica (s) | | | | | | | | | 5 | | 5 |
| Pentaerythritol tetrakis 3-(3,5-di-tert-butyl-4-hydroxy-phenyl) propionate (t) | 0.5 | 0.5 | 0.5 | 0.5 | 0.5 | 0.5 | 0.5 | 0.5 | 0.5 | 0.5 | 0.5 |
| Total % by weight | 100 | 100 | 100 | 100 | 100 | 100 | 100 | 100 | 100 | 100 | 100 |
| Compatibility | No | Yes | Yes | No | Yes | Yes | Yes | Yes | Yes | Yes | Yes |
| Viscosity (170° C.) mPa·s | | 4500 | 4000 | | 6000 | 6000 | 6000 | 5700 | 4500 | 37000 | 33000 |
| Sealing temperature ° C. | | >150 | >150 | | >150 | 100 | 85 | 80 | 80 | 80 | 80 |
| Transfer/blockin measurement | | No | No | | No | No | No | No | No | slight | slight |
| Dynamic COF | | 0.2 | 0.2 | | 0.2 | 0.3 | 0.3 | 0.2 | 0.2 | 0.2 | 0.2 |
| Open assembly time in seconds | <1 | <1 | <1 | <1 | <1 | <1 | <1 | <1 | <1 | <1 | <1 |

Equivalence between chemical names and trade names:
(i) ESTERGRAN 10 EHG Ci
(j) MATER-BI TF01U/095R
(k) CAPA 6400
(l) ECOFLEX FBX 7011
(m) PLA 6251 D
(n) DERTOLINE G2L
(o) DERTOPHENE H 150
(p) CRODAMIDE VRX
(q) PARAFFIN 58/60
(r) CARBOVAX 3350
(s) SILICA LO-VEL 29
(t) IRGANOX 1010.

The choice of each of the components of the formulation moreover has an impact on their overall compatibility in the final composition. In fact, not all of the mixtures allow homogeneous compositions to be obtained systematically.

A compatibility defect is noted in formulations I and L of the comparative examples when the component C is a paraffin compared to the oleamide in the formulations K and M.

The choice of the polymer A has an impact on the reactivation temperature of the final composition. In fact, certain polymers used in the prior art do not allow hot-melt adhesives to be obtained with the target reactivation temperatures. In fact reactivation temperatures are noted that are above 150° C. in the formulations J, K, and M of the comparative examples when the component A is PLA or an aromatic copolymer.

TABLE 2

| Formulations | 7 | 8 |
|---|---|---|
| Chemical Name | | |
| Polycaprolactone polyester copolymer (i) | | 35 |
| Polyester produced by reaction between a monoethylene glycol and sebacic acid (j) | 35 | |
| Glycerol rosin ester (n) | | |
| Phenolic terpene resin (o) | 44.5 | 44.5 |
| Stearamide (p') | 20 | |
| Ethylene bis oleamide (p") | | 20 |
| Pentaerythritol tetrakis 3-(3,5-di-tert-butyl-4-hydroxyphenyl) propionate (t) | 0.5 | 0.5 |
| Total % by weight | 100 | 100 |
| Viscosity (170° C.) mPa·s | 1560 | 4800 |
| Ring and ball | 71° C. | 79° C. |
| Open assembly time in seconds | 25 | 15 |
| Cure time | 6 | 5 |

(i) ESTERGRAN 10 EHG
(j) MATER-BI TF01U/095R
(n) DERTOLINE G2L
(o) DERTOPHENE H 150
(p') CRODAMIDE S
(p") CRODAMIDE EBO

The formulations given in Table 2 above are representative of the hot-melt adhesive compositions the open assembly times of which are greater than 2 seconds, which makes them suitable for application on rigid supports such as standard cardboards.

The invention claimed is:

1. A biodegradable hot-melt adhesive composition, comprising
    (A) from 30% to 90% by weight with respect to the total weight of the adhesive composition, of (A1) a polycaprolactone homopolymer, (A2) polyesters resulting from the condensation of a carboxylic diacid of formula $R_1$—$[COOH]_2$ in which $R_1$ represents a linear or cyclic $C_2$-$C_{30}$ hydrocarbon group, saturated or unsaturated, mono or polyhydroxylated with a diol of formula $R_2[OH]_2$ in which $R_2$ represents a linear, cyclic or polycyclic $C_2$-$C_{32}$ hydrocarbon group, saturated, unsaturated or polyunsaturated, or mono or polyhydroxylated, or (A3) polycaprolactone (A1) and polyester (A2) copolymers;

(B) from 10% to 50% by weight with respect to the total weight of the adhesive composition, an adhesion-promoting agent or tackifier having an average molar mass by weight $M_w$ between 300 and 5000, which agent or tackifier is:
   (i) rosins of natural origin or modified;
   (ii) terpene resins resulting from the polymerisation of terpene hydrocarbons in the presence of Friedel-Crafts catalysts, optionally modified by the action of phenols;
   (iii) copolymers based on natural terpenes;
(C) from 10% to 30% by weight with respect to the total weight of the adhesive composition of a stiffening agent represented by a wax having a melting point within the range of 40° C. to 150° C.,
(D) 0% to 20% by weight with respect to the total weight of the adhesive composition of one or more additives that are stabilizers, antioxidants, anti-blocking agents, pigments, colorants or fillers.

2. The composition according to claim 1 in which (A) has a number-average molecular mass (Mn) from 500 to 100,000 g/mol.

3. The composition according to claim 1 in which the carboxylic diacid of formulation $R_1$—[COOH]$_2$ is sebacic, succinic, adipic, aldaric, alpha-ketoglutaric, aspartic, azelaic, camphoric, fumaric, glutaconic, glutaric, itaconic, maleic, malic, malonic, meglutol, mesaconic, mesoxalic, or 3-methylglutaconic acid.

4. The composition according to claim 1 in which the diol of formula $R_2$[OH]$_2$ is a linear, saturated or unsaturated diol having a structure of formula $R_2$[OH]$_2$ in which $R_2$ represents a $C_2$-$C_{22}$ hydrocarbon group, a diol of formula $R_2$[OH]$_2$ in which $R_2$ represents a monoethylene glycol or polyethylene glycol of formula HO—(—CH$_2$—CH$_2$—O—)$_n$—H such that n is an integer from 1 to 6.

5. The composition according to claim 1 in which (B) is glycerol or pentaerythritol rosin esters, terpenes, or phenolic terpenes.

6. The composition according to claim 1 in which (C) is amide waxes of the oleamide, stearamide, ethylene bis-oleamide, ethylene bis-stearamide type.

7. The composition according to claim 1 in which (A) represents a polyester obtained by reaction between monoethylene glycol and sebacic acid;
(B) represents a phenolic terpene resin;
(C) represents an amide wax of oleamide or erucamide, or cis-13-docosenamide;
(D) represents an anti-blocking additive that is polyethylene glycol, precipitated silica or a mixture thereof.

8. The composition according to claim 1 having an open assembly time less than 1 second.

9. The composition according to claim 1 having an open assembly time greater than or equal to 2 seconds.

10. The composition according to claim 1, having a biodegradability according to standard EN ISO 14855 greater than 55%.

11. A method for creating a seal between two non-flexible supports comprising:
   providing a wrapping coated with the biodegradable hot-melt adhesive composition of claim 1:
   positioning the wrapping around a container; and
   heating the wrapping in order to melt the hot-melt adhesive and cause adhesion between the wrapping and the container.

12. In a method of melting pan and roller coating, comprising employing a hot-melt adhesive composition, the improvement wherein the hot-melt adhesive composition is a composition according to claim 1 the viscosity of which is between 500 and 20,000 mPa·s, at 170°.

13. In a method of melting pan or drum draining and spray coating, comprising employing a hot-melt adhesive composition, the improvement wherein the hot-melt adhesive composition is a composition according to claim 1, the viscosity of which is between 2000 and 50,000 mPa·s, at 170°.

14. In a method of extrusion coater and spray coating comprising employing a hot-melt adhesive composition, the improvement wherein the hot-melt adhesive composition is a composition according to claim 1 the viscosity of which is between 70,000 and 200,000 mPa·s, at 170°.

15. A non-flexible to rigid biodegradable packaging suitable for food use or non-food use, comprising a composition according to claim 1.

16. A rigid packaging, box or case closures, cardboard trays, labeling on bottles, binding, coating on paper or cardboard, comprising a composition according to claim 1.

17. The composition of claim 1, wherein (C) is optionally hydroxylated amide waxes, hydrogenated castor oils, synthetic waxes, oxidized or not, functionalized or not, or polyethylene oxides of which the average molecular mass by weight is greater than 1000.

18. The composition of claim 1 wherein (B) is phenolic terpenes having a softening point comprised between 100° C. and 150° C.

19. The composition of claim 6, wherein (C) has a melting point between 60° C. and 120° C.

20. A method for creating a seal between two non-flexible supports, comprising heating a biodegradable hot melt adhesive according to claim 1 on a coating wrapped around a container so as to cause adhesion between the wrapping and the container.

* * * * *